Dec. 8, 1970 D. W. DAY 3,546,612
NON-LINEAR CONDITION SENSOR AND COMPENSATING AMPLIFIER THEREFOR
Filed Sept. 16, 1968 2 Sheets-Sheet 1

INVENTOR.
Donald W. Day
BY
ATTORNEYS

INVENTOR.
Donald W. Day
BY
Wolfe, Hubbard, Voit & Osann
ATTORNEYS

# United States Patent Office 3,546,612
Patented Dec. 8, 1970

3,546,612
NON-LINEAR CONDITION SENSOR AND COMPENSATING AMPLIFIER THEREFOR
Donald W. Day, Loves Park, Ill., assignor to Barber-Colman Company, Rockford, Ill., a corporation of Illinois
Filed Sept. 16, 1968, Ser. No. 762,267
Int. Cl. G01n 27/00; H03f 1/34, 3/18
U.S. Cl. 330—17        10 Claims

ABSTRACT OF THE DISCLOSURE

An electrical signal transmitter incorporating selectively effective negative feedback in an amplifier substantially to linearize the amplified output of a non-linear condition sensing element.

BACKGROUND OF THE INVENTION

The measurement of relative humidity and the transmission of the measurement obtained to a remote point is complicated by the narrow range of relative humidities covered by some condition sensing elements. Other sensing elements respond over extremely wide humidity ranges, but elements of this type exhibit non-linear response characteristics which result in output signals not readily usable in readout or control systems. The use of a plurality of condition sensors, each linearly effective over a narrow portion of the total range, offers one solution in a wide range system, but this is expensive and creates difficult circuit problems. Various means have been proposed for linearizing wide range sensor outputs, but in many applications they have proved to be either too complicated or too expensive to be satisfactory.

OBJECTS OF THE INVENTION

It is a general object of the invention to compensate, at least partially, for the non-linearity in the output signal of a condition sensor over a given and relatively wide range by feeding the signal through a normally linear amplifier the incremental gain of which is automatically changed under certain operating conditions to make the amplifier's overall response characteristic non-linear. More specifically it is an object of the present invention to impart the proper non-linearity to the response characteristic of such an amplifier so as to produce a substantially linear output in response to a signal from a non-linear condition sensor which produces an electrical output signal whose values when plotted against corresponding range of values of the measured condition are distributed in the shape of a diagonally extending letter S.

It is a further object of the present invention to impart the proper amount of non-linearity to the overall input-output characteristic of a normally linear amplifier so as to compensate for the non-linearity in the output signal produced by a condition sensor whose values when plotted against a corresponding range of values of the measured condition are distributed in the general shape of an upwardly concave curve continued by a substantially tangentially extending straight line. A related object of the present invention is to provide the proper non-linearity in the overall gain characteristic of such an amplifier to compensate for the non-linearity in the electrical signal produced by a non-linear condition sensor where the values of the sensor output signal, when plotted against a corresponding range of values of the measured condition are distributed in the general shape of a diagonally upwardly extending line merging tangentially into a downwardly concave curve.

Other objects and advantages will become apparent as the following description proceeds, taken in conjunction with the accompanying drawings.

Figure 1:
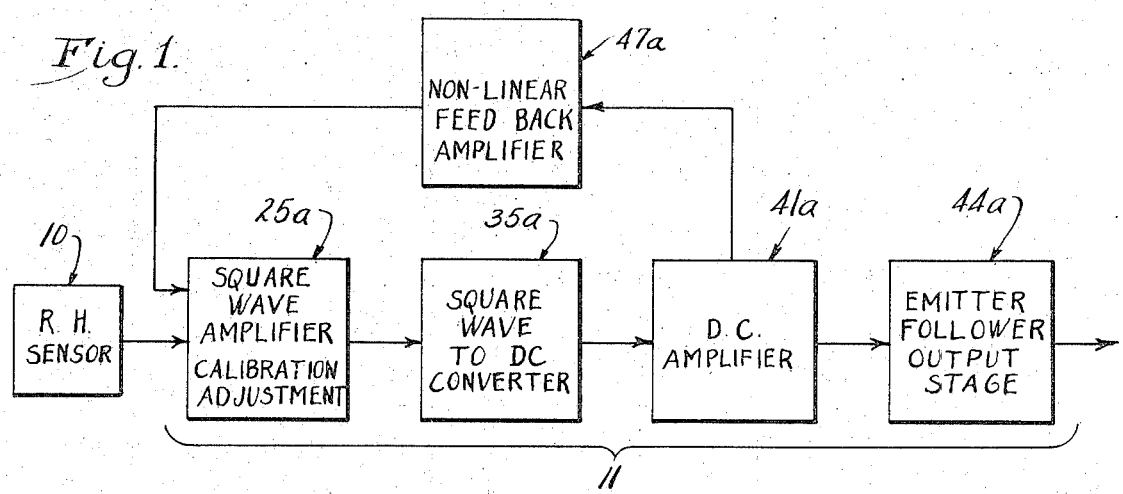
FIG. 1 is a block diagram of a signal transmitter incorporating a non-linear condition sensor and an amplifier and embodying the present invention.

While the invention has been shown and will be described in some detail with reference to a preferred, exemplary embodiment thereof, there is no intention that it thus be limited to such detail. On the contrary, it is intended here to cover all modifications, alternatives, and equivalents falling within the spirit and scope of the invention.

DESCRIPTION OF THE PREFERRED EMBODIMENT

In the description which follows reference will be made mainly to the schematic diagram of the signal transmitter shown in FIG. 2. However, reference may be readily made by the reader to the block diagram of FIG. 1 as an aid in understanding the general organization of the signal transmitter. To facilitate understanding and correlating the two figures, the blocks in FIG. 1 bear the same reference numerals, but with the suffix "a" added, as the transistors in FIG. 2 to which the blocks correspond.

Figure 2:
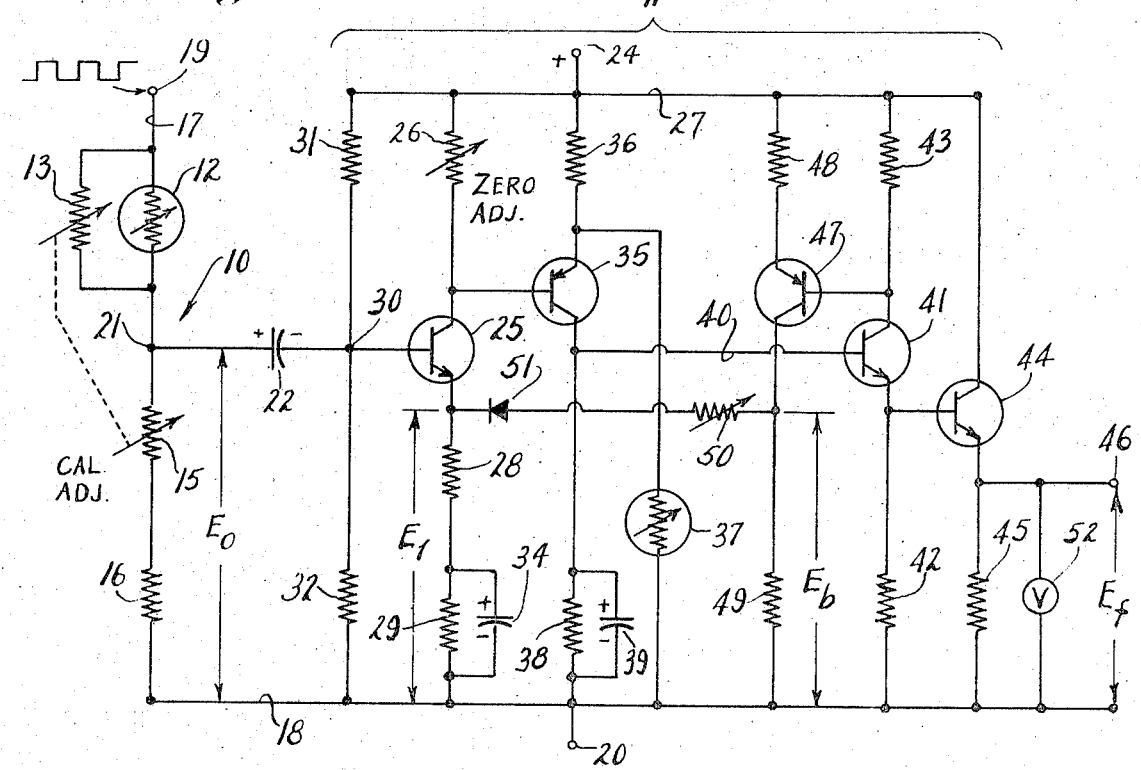
FIG. 2 is a schematic circuit diagram of the signal transmitter shown generally in FIG. 1.
Figure 3:
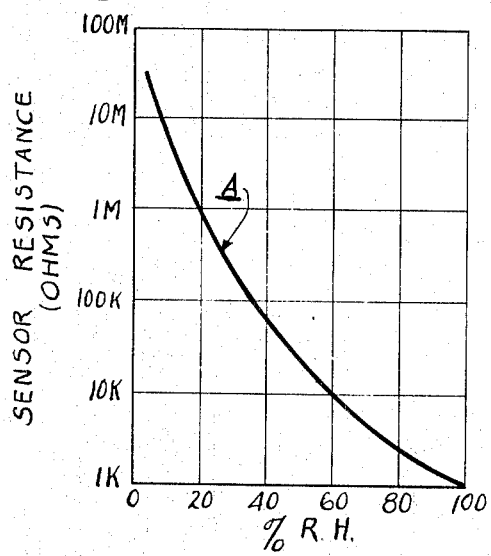
FIG. 3 is a semi-logarithmic graph of resistance plotted against relative humidity for a typical and well known wide range humidity sensing element.

The transmitter shown in FIG. 2 comprises a condition sensing network 10 and an amplifier 11. A single variable resistance humidity sensing element 12 is employed to cover the wide range of 20% to 80% in relative humidity and may be made of a chemically treated styrene copolymer, which has an electrically conducting surface layer fixed on a non-conducting substrate and so constructed that changes in relative humidity cause the surface resistivity to vary. The PCRC-11 humidity sensor made and commercially sold by Phys-Chemical Research Corp. is such a wide range sensor which presents a resistance varying with relative humidity in accordance with the graph A shown in FIG. 3.

To reduce the effective resistance range of the sensor, it is shunted by a resistor 13, and the parallel combination is connected in series with resistors 15 and 16 between a square wave AC voltage supply line 17 and a common line 18. The square wave voltage source is not shown, but is connected across lines 17 and 18 at terminals 19 and 20, respectively. A square wave AC supply is used because operation on direct current results in shifting calibration and because an accurately controlled voltage source is needed. A square wave source is more easily controlled than a sine wave source and is therefore preferred although not absolutely necessary.

To adjust the calibration of the voltage divider which forms the sensing network 10 so as to accommodate the normal variation of characteristics from one element to another, the resistors 13 and 15 are variable and ganged, as schematically shown. An AC (square wave) output voltage $E_0$ is produced by the condition sensing network 10 between the common line 18 and junction 21 of the element 12 and the resistor 15. The relationship between the amplitude of the voltage $E_0$ and the relative humidity being sensed is graphically shown in FIG. 4 as a solid line B having the shape of a diagonally upwardly extending letter S, while the ideal and desired linear relationship is shown as a straight dashed line C.

The amplifier 11 is connected at a pair of terminals 20 and 24 to a regulated DC voltage source (not shown). Its first stage 25a serves to amplify the AC square wave output of the network 10, and comprises an NPN transistor 25, its collector connected through a zero adjusting variable resistance 26 and a DC supply line 27 to the positive terminal 24, its emitter connected through a pair of series connected emitter resistors 28 and 29 to the common line 18, and its base connected to a junction 30 between a pair of biasing resistors 31 and 32 connected in series between lines 27 and 18 to establish a fixed DC reference voltage at the base.

The AC (square wave) output of the network 10 is delivered from the junction 21 to the junction 30 through a coupling capacitor 22 which isolates the network 10 from the DC in the amplifier 11. A DC emitter bias voltage $E_1$, is established by the resistors 28 and 29, the latter having a capacitor 34 in parallel therewith. The output of the square wave amplifying stage 25a is a variable amplitude AC (square wave) voltage superimposed upon a substantially constant DC component, such output appearing at the collector due to the changes in the voltage drop across the load resistor 26 with changes in collector current.

The square wave component output of the first stage 25a is amplified and converted into a variable DC signal in a second stage 35a comprising principally a PNP transistor 35 whose base is directly connected to the collector of the transistor 25 of the preceding stage, and whose emitter is connected through an emitter resistor 36 to the DC supply line 27 and through a temperature compensating network 37 (shown here for convenience simply as a temperature sensitive resistor) to the common supply line 18. Such networks are well known in the art and will not be described in detail. The resistor 36 and the network 37 provide to the emitter of the transistor 35 a reference voltage of sufficient magnitude with respect to the input at the base of that transistor to permit it to conduct only DC pulses, i.e., only during the more positive half cycles of the square wave applied to the base. As the ambient temperature increases, the resistance of the compensating network 37 decreases, drawing more current through the emitter resistor 36, tending to decrease the emitter-base voltage on the transistor 35 and to reduce the conductivity of that transistor so as to compensate for the latter's inherent increase in conductivity resulting from an increase in ambient temperature. To convert the amplifier DC pulses applied to the transistor 35 into a smooth, corresponding DC signal, a load resistor 38, connected between the collector of the transistor 35 and the common line 18 is shunted by a storage capacitor 39. The capacitor 39 charges when pulses of current are received through the transistor 35 and discharges slightly between such pulses to provide a substantially steady DC output signal which varies in magnitude according to changes in amplitude of the AC signal applied through capacitor 22 to the base of transistor 25.

To further amplify the output of the Square Wave to DC Converter stage 35a it is applied to a DC current and voltage amplifying third stage 41a. This stage comprises an NPN transistor 41 connected to receive at its base through a conductor 40 the DC output signal produced by the second stage 35a. Indeed, the base-emitter junction of the transistor 41 forms part of a discharge path for the storage capacitor 39 of the second stage 35a, this path being completed by an emitter resistor 42 connected between the emitter of the transistor 41 and the common line 18. DC current is fed to the collector of the transistor 41 over the supply line 27 through a resistor 43 connected between the two.

The output of the third, DC amplifying stage 41a appearing across the emitter resistor 42 is amplified further in a DC amplifying output stage 44a, comprising an NPN transistor 44 connected as an emitter follower. Its base is its input and is connected to the emitter of the preceding stage transistor 41. The collector of the transistor 44 is connected directly to the DC supply line 27, while its emitter is connected through a load resistor 45 to the common line 18 and to an output terminal 46 associated with that stage. The final signal voltage $E_f$ produced by the output stage 44a and appearing across the load resistor 45 is shown as a solid line D in FIG. 5 in relation to the relative humidity being sensed, and a dashed line F in the figure represents the ideal linear relationship which is desired.

Figure 4:
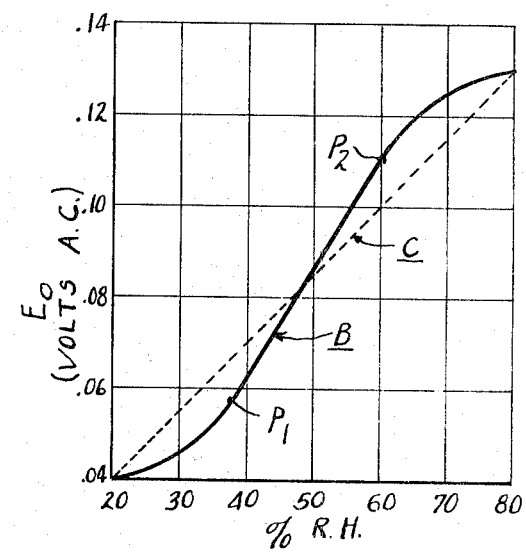
FIG. 4 is a graph of the sensor output signal plotted against relative humidity with a straight line indicating the ideal, desired, output for such a sensor.

As described thus far, the four stage amplifier comprised of stages 25a, 35a, 41a, and 44a is linear in its overall gain, i.e., its input-output characteristic. Its output across reisstor 45 would be a DC signal directly proportional to the amplitude of the signal $E_0$ produced by the conduction sensing network 10 due to the changes in the resistance of element 12. And, since the latter varies non-linearly with relative humidity, as shown in FIG. 4, the output of the four stage amplifier 11 would, without modification, be non-linear having the same diagonally extending S shape as the sensor network output shown in FIG. 4.

In accordance with a principal feature of the present invention, the overall gain or input-output characteristic of the four stage amplifier is made selectively non-linear in such a way as to compensate for the non-linearity in the output of the sensor network 10 caused by the non-linear output characteristic of the condition sensor 12. This is accomplished by selectively and automatically changing the incremental gain of the amplifier. The term "incremental gain" denotes the ratio of the small change in amplifier output resulting from a small change in input, or the slope of the input-output characteristic curve, at a particular value of the input signal. More specifically, means are provided for automatically reducing the incremental gain of the amplifier from its normal, preset gain level in response to the output signal $E_0$ exceeding a first predetermined value as a consequence of the relative humidity rising above a corresponding predetermined value. Further, means are provided for returning the incremental gain of the amplifier substantially to its preset level in response to the input signal $E_0$ exceeding a second, higher value as a consequence of the measured condition exceeding a corresponding second, higher preselected value.

In keeping with this feature of the invention, the first predetermined value of the measured condition corresponds to that point $P_1$ at which the upwardly concave bottom portion of the diagonally S shaped curve B (FIG. 4) representing sensor output versus measured condition merges into the generally straight line intermediate portion of the curve. In the present example, the point $P_1$ represents a relative humidity of approximately 38% and the voltage $E_0$ is about .056 volt. In further keeping with this feature of the invention, the second, preselected value of the measured condition corresponds to that point $P_2$ on the aforesaid curve at which the intermediate, generally straight portion of the curve merges into the top, downwardly concave portion of the curve. In this example, the point $P_2$ corresponds to a relative humidity of approximately 60% and the voltage $E_0$ is about .110 volt. The incremental gain of the amplifier is reduced only for those values of the measured condition that fall on the generally linear intermediate portion of the curve B, i.e., the portion having the highest slope and therefore greatest ratio of signal change to condition change. Accordingly, reduction of amplifier incremental gain in this limited region has the effect of linearizing the resulting amplifier output, as shown by the curve D in FIG. 5 so that it approaches much more closely (although not exactly) the desired straight line F.

In the exemplary embodiment shown in FIGS. 1 and 2, the means for reducing the incremental gain of the amplifier, shown as comprised of the stages 25a, 35a, 41a and 44a, is a conditionally operative negative feedback loop connected from a given stage of the amplifier to a preceding stage. To reduce the gain of the amplifier, the feedback is rendered operative when the output signal $E_0$ exceeds .056 volt, but is rendered constant to return the incremental gain of the amplifier to its preset level when the output signal $E_0$ exceeds about .110 volt.

Referring further to FIGS. 1 and 2, the conditionally operative negative feedback loop includes a feedback current amplifying stage 47a, connected between the third stage 41a and the first stage 25a. The feedback current amplifying stage comprises principally a PNP transistor 47 having a base connected directly to the collector of the third stage transistor 41, an emitter connected through an emitter resistor 48 to the positive supply line 27, and a collector connected through a load resistor 49 to the common line 18.

Also part of the negative feedback loop is a conditionally operative path comprised of a variable resistor 50 connected in series with a diode 51 between the collector of the transistor 47 and the emitter of the first stage transistor 25. Negative feedback action is exerted on the first stage only under certain conditions. Specifically, when the third stage transistor 41 conducts, a voltage drop is produced across its collector resistor 43, causing a proportional feedback input current to flow through the emitter-base junction of the transistor 47, and a proportional amplified current flow between the supply lines 27 and 18 through the emitter resistor 48, the transistor 47 and the load resistor 49, producing a feedback voltage $E_b$ across the latter. The diode 51 between the load resistor 49 and the first stage transistor 25 is connected with its cathode toward the emitter of the transistor 25 for forward conduction into the load resistor 28 that transistor. Accordingly, in keeping with the present invention if the feedback voltage $E_b$ across the load resistor 49 exceeds the D.C. emitter bias voltage $E_1$ of the transistor 25, i.e., if the measured condition signal by the network 10 at the input of the amplifier 11 exceeds a predetermined first value, the negative feedback loop is operative and a negative feedback current flows through the variable resistor 50 and the diode 51 into the resistors 28, 29 of the first stage. Such additional current raises the voltage drop across the resistors 28 and 29, thereby reducing the base-emitter voltage of transistor 25, and therefore reducing the current flow and voltage drop through and across its load resistor 26. As the output voltage $E_0$ rises above .056 volt, therefore, the voltage $E_b$ becomes progressively larger than the voltage $E_1$ which would exist in the absence of negative feedback, and the gain of the amplifier is reduced.

Alternatively, if the feedback voltage across the load resistor 49 does not exceed the first stage emitter bias voltage $E_1$ sufficiently to forward bias the diode 51, i.e., if the measured condition does not exceed the first predetermined value and the output signal is less than .056 volt then the flow of feedback current through the diode is blocked, the feedback loop is inoperative and the gain of the amplifier remains at its preset normally high level.

As stated previously, it is another feature of the present invention to return the incremental gain of the amplifier to its preset level when the measured condition exceeds a second preselected value. It was also stated that, in the disclosed embodiment of the invention, this is brought about by causing the negative feedback signal to become constant at and above a preselected value of the measured condition, e.g., when the output voltage $E_0$ exceeds about .110 volt, so that as a result the negative feedback action is not increased even if the output voltage rises to a higher value. In the circuit disclosed in FIG. 2, this function is performed by the feedback amplifying stage 47a which is made non-linear for this purpose. Specifically, means, here shown as the resistors 48 and 49, are provided for limiting the amount of feedback current produced by the feedback amplifying stage 47a. Means are also provided, here shown as the resistors 43 and 48, for causing the maximum feedback current to be reached when the value of the measured condition reaches the aforesaid second preselected value. Thus, the maximum load current that can flow through the transistor 47, when its emitter-base voltage turns it "fully on" or conductive, is determined by the combined values of the resistors 48 and 49, while the corresponding maximum feedback voltage that can appear across the resistor 49 depends upon the relative values of the same two resistors. And, the effect of the feedback voltage across the resistor 49 upon total amplifier gain is a function of feedback current passed through the resistors 28 and 29, which may be varied by adjusting the value of the resistor 50. Finally, the value of the measured condition beyond which an increase in the feedback input current to the stage 47a can no longer increase the feedback load current produced by that stage, i.e., the value at which the stage becomes saturated, is established by the selection of the resistance ratio of the resistors 43, 48 which determines the value of the output voltage $E_0$ at which the emitter-base current in the transistor 47 becomes large enough to turn the collector path "fully on."

Figure 5:
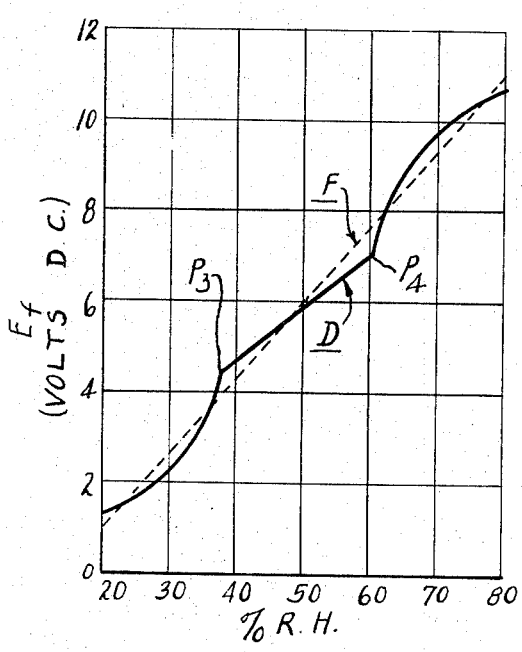
FIG. 5 is a graph of transmitter output plotted against relative humidity, with a straight line showing the ideal, desired output of the transmitter.

Referring now to FIGS. 4 and 5 feedback first becomes effective in the exemplary circuit of FIG. 2 at approximately 38 percent relative humidity, as shown by point $P_1$ on the lower arcuate position curve B in FIG. 4. Below that point the feedback loop is inoperative, because the diode 51 is non-conductive, and the curve D (FIG. 5) of amplifier output remains similar in shape to that of the curve B. In the region immediately above 38 percent relative humidity where the upwardly concave portion of the curve B becomes generally linear, as shown by the straight line portion extending tangentially toward the right of the upwardly concave portion of the curve, the feedback loop becomes operative, reducing the incremental gain of the amplifier so that its output $E_f$ becomes more nearly linear, as shown by the straight line portion of diminished slope extending upwardly from point $P_3$ of curve D in FIG. 5.

This mode of operation is maintained until about 60 percent relative humidity, where the shape of the curve B again changes from a generally straight diagonally extending line to a tangential, downwardly concave curve. As the input signal from the sensor network 10 exceeds about .110 volt (point $P_2$ in FIG. 4) the feedback loop is again altered, this time by the saturation of the transistor 47 which thereafter holds the feedback current constant. As a result, the shape of the transmitter output voltage $E_f$ (curve D) above 60 percent relative humidity (point $P_4$ in FIG. 5) again becomes similar to the shape of the transducer network output voltage $E_0$ (curve B).

Although the linearizing amplifier described herein has been designed for linearizing an S shaped input, it will be apparent that, by choice of resistance values and transistors to omit the saturation of the transistor 47, an upwardly concave curve merging tangentially into a straight line could be linearized without departing from the present invention. Similarly a curve having the shape of a diagonally extending straight line merging tangentially into a downwardly concave curve may be linearized in accordance with the amplifier of the present invention simply by omitting the diode 51.

The transmitter incorporating the sensor network 10 and the amplifier 11 of the present invention may be used to supply a final signal $E_f$ which is indicative of the relative humidity or other condition being sensed, as by element 12, to a remote utilization device which is shown merely as an example in FIG. 2 in the form of a voltmeter 52 but which may be a remote controller modifying some process as a function of the sensed condition. In such applications it is often desirable to provide a predetermined threshold value (e.g., 1.0 volt) of the signal $E_f$ which is indicative of a preselected low value (e.g., 20% R.H.) of the sensed condition. This may be accomplished with the amplifier shown in FIG. 2 by adjusting the value of the load resistor 26 to produce that particular base bias on transistor 35 needed to provide the required final signal (e.g., 1.0 volt) when the preselected lower value (e.g., 20% R.H.) of the sensed condition is being detected. This establishes accuracy at the lower end of the range of operation. It may also be desirable to provide another predetermined output value (e.g., 11 volts) to indicate a preselected upper limit value (e.g., 80% R.H.) of the sensed condition. This may be accomplished, after the zero adjustment has been made, by adjusting the value of the feedback resistor 50 to provide the feedback action which is necessary to change the slope of the curve D between points $P_3$ and $P_4$ such that the desired output (e.g., 11 volts) is created at the upper limit (e.g., 80% R.H.) of the sensed condition. This establishes accuracy at the upper end of the desired range of operation, and makes the final signal vary substantially proportionally between 1.0 volt and 11.0 volts as the relative humidity varies between 20% and 80%. In order for the latter adjustment to be the most effective, the intermediate portion of the output curve D subject to feedback control should include the point of inflection of the curve B.

It has been found that the present invention provides a marked improvement in the linearity of the condition-sensing transmitter, although perfect linearity is not necessarily obtained. In one embodiment, for example, in which the uncompensated sensing element resulted in a departure of about 10% from ideal linearity, the use of the conditionally operative feedback as described resulted in the final voltage departing by only about 1½% from a linear relationship with sensed humidity.

I claim as my invention:

1. An electrical proportional signal transmitter comprising in combination,
    (a) a non-linear condition sensor which produces an electrical output signal whose values when plotted against a corresponding range of values of said condition are distributed in the shape of a diagonally extending letter S; and
    (b) a multi-stage amplifier connected to receive said output signal, said amplifier normally having a predetermined incremental gain level providing a normally linear amplification and including
        (1) means for automatically reducing the incremental gain of said amplifier from said predetermined level in response to said signal exceeding a first predetermined value, and
        (2) means for returning the incremental gain of said amplifier substantially to its predetermined level in response to said signal exceeding a second, higher pre-selected value.

2. An electrical signal transmitter comprising in combination,
    (a) a non-linear condition sensor which produces an electrical output signal whose values when plotted against a corresponding range of values of said condition are distributed in the shape of a diagonally extending letter S; and
    (b) a multi-stage amplifier connected to receive said output signal and having
        (1) a plurality of stages normally operating with a linear response to provide a predetermined and constant incremental gain,
        (2) a conditionally operative negative feedback loop connected from a given stage of said amplifier to a preceding stage thereof to reduce the incremental gain of said amplifier when said feedback loop is rendered operative,
        (3) means for rendering said feedback loop operative in response to said output signal exceeding a first predetermined value to reduce the incremental gain, and
        (4) means for returning said amplifier substantially to its predetermined incremental gain in response to said output signal exceeding a second, higher pre-selected value, said means including a saturable feedback current amplifying stage within said feedback loop, said stage saturating when said output signal exceeds said second pre-selected value.

3. An electrical proportional signal transmitter comprising in combination,
    (a) a non-linear condition sensor which produces an electrical signal whose values when plotted against a corresponding range of values of said condition are distributed in the general shape of an upwardly concave curve continued by a tangentially extending substantially straight line; and
    (b) a multi-stage amplifier connected to receive said output signal, said amplifier normally having a predetermined incremental gain level for linear amplification and including
        (1) means for automatically reducing the incremental gain of said amplifier from said predetermined level in response to said signal exceeding a predetermined value corresponding to a point near which said concave curve merges into said straight line.

4. An electrical proportional transmitter comprising in combination,
    (a) a non-linear condition sensor which produces an electrical signal whose values when plotted against a corresponding range of values of said condition are distributed in the general shape of a diagonally upwardly extending substantially straight line merging tangentially into a downwardly concave curve; and
    (b) a multi-stage amplifier connected to receive said output signal, said amplifier normally having a predetermined incremental gain level for linear amplification and including
        (1) means for reducing the incremental gain of said amplifier from said predetermined level for values of said signal below a pre-selected value corresponding to a point near which said straight line merges into said curve, and
        (2) means for returning the incremental gain of said amplifier substantially to its predetermined level in response to said signal exceeding said pre-selected value.

5. For use in substantially linearizing the signal from a non-linear condition sensor which produces an electrical output signal whose values when plotted against a corresponding range of values of said condition are distributed in the shape of a diagonally extending letter S, a non-linear amplifier adapted to receive said output signal as its input and comprising in combination,
    (a) a plurality of amplifying stages normally creating linear amplification with a predetermined incremental gain;
    (b) means for reducing the incremental gain of said amplifier from said predetermined gain in response to said input exceeding a first predetermined value; and
    (c) means for returning the incremental gain of said amplifier substantially to its predetermined level in response to said input exceeding a second, higher pre-selected value.

6. The apparatus of claim 2 wherein said preceding stage of said amplifier includes means for producing a biasing voltage normally biasing said preceding stage into conduction to a preset extent, wherein said saturable feedback current amplifying stage includes a load resistor and means for driving feedback current through said load resistor to establish a proportional feedback voltage across it, and wherein said conditionally operative feedback loop includes a diode connected between said load resistor and said means for biasing and poled so as to conduct and supply negative feedback current through said preceding stage only when said feedback voltage exceeds said biasing voltage.

7. For use in amplifying the signal from a non-linear condition sensor which produces an electrical output signal whose values when plotted against a corresponding range of values of said condition are distributed in the shape of a diagonally extending letter S, a non-linear amplifier adapted to receive said output signal as its input and comprising in combination,
 (a) a plurality of amplifying stages normally creating linear amplification with a predetermined incremental gain;
 (b) means for reducing the incremental gain of said amplifying stages from said predetermined gain in response to said input exceeding a first predetermined value, including
   (b1) a conditionally operative negative feedback loop connected from a given one to a preceding one of said amplifying stages, and
   (b2) means for rending said feedback loop operative in response to said input exceeding said predetermined value; and
 (c) means for returning the incremental gain of said amplifying stages substantially to said predetermined level in response to said input exceeding a second, higher pre-selected value.

8. For use in amplifying the signal from a non-linear condition sensor which produces an electrical output signal whose values when plotted against a corresponding range of values of said condition are distributed in the shape of a diagonally extending letter S, a non-linear amplifier adapted to receive said output signal as its input and comprising in combination,
 (a) a plurality of amplifying stages normally creating linear amplification with a predetermined incremental gain;
 (b) means for reducing the incremental gain of said amplifying stages from said predetermined gain in response to said input exceeding a first predetermined value, including
   (b1) a conditionally operative negative feedback loop connected from a given one to a preceding one of said amplifying stages,
   (b2) means for producing a biasing voltage normally biasing said preceding one stage into conduction to a preset extent;
   (b3) said feedback loop including
    (1) a load resistor,
    (2) means for driving feedback current through said load resistor in response to a signal at the output of said given one stage to establish a proportional feedback voltage across said load resistor, and
    (3) a diode connected between said load resistor and said means for biasing and poled so as to conduct and supply negative feedback current through said preceding one stage only when said feedback voltage exceeds said biasing voltage; and
 (c) means for returning the incremental gain of said amplifying stages substantially to said predetermined level in response to said input exceeding a second, higher pre-selected value.

9. For use in amplifying the signal from a non-linear condition sensor which produces an electrical output signal whose values when plotted against a corresponding range of values of said condition are distributed in the shape of a diagonally extending letter S, a non-linear amplifier adapted to receive said output signal as its input and comprising in combination,
 (a) a plurality of amplifying stages normally creating linear amplification with a predetermined incremental gain;
 (b) means for reducing the incremental gain of said amplifying stages from said predetermined gain in response to said input exceeding a first predetermined value, including
   (b1) a conditionally operative negative feedback loop connected from a given one to a preceding one of said amplifying stages; and
 (c) means for returning the incremental gain of said amplifying stages substantially to said predetermined level in response to said input exceeding a second, higher pre-selected value, including as a part of said negative feedback loop
   (c1) a load resistor,
   (c2) a saturable current amplifying stage connected to drive feedback current through said load resistor in response to a signal produced by said given stage, and
   (c3) means for applying to said preceding one stage a voltage proportional to that generated across said load resistor by said feedback current.

10. The apparatus of claim 7 further characterized in that said means (c) for returning the incremental gain of said amplifying stages substantially to said predetermined level includes a saturable feedback current amplifying stage within said feedback loop, said stage saturating when said input exceeds said second pre-selected value.

References Cited

UNITED STATES PATENTS

| | | | |
|---|---|---|---|
| 2,849,180 | 8/1958 | Burke et al. | 328—142X |
| 3,252,007 | 5/1966 | Saari | 330—28X |
| 3,206,685 | 9/1965 | Polasek | 328—142 |
| 3,252,007 | 5/1966 | Saari | 330—28X |

ROY LAKE, Primary Examiner

S. H. GRIMM, Assistant Examiner

U.S. Cl. X.R.

307—264; 324—71; 328—4, 142; 330—19, 20, 28, 29, 85, 110; 340—235